United States Patent [19]

Honig

[11] Patent Number: 4,998,184

[45] Date of Patent: Mar. 5, 1991

[54] VEHICLE HEADLIGHT

[75] Inventor: Hans-Henning Honig, Salzkotten, Fed. Rep. of Germany

[73] Assignee: Hella KG Hueck & Co., Lippstadt, Fed. Rep. of Germany

[21] Appl. No.: 510,829

[22] Filed: Apr. 18, 1990

[30] Foreign Application Priority Data

Apr. 21, 1989 [DE] Fed. Rep. of Germany ....... 3913152

[51] Int. Cl.[5] .......................... B60Q 1/06; F21V 7/16

[52] U.S. Cl. ...................................... 362/66; 362/284; 362/289; 362/428

[58] Field of Search ................... 362/61, 66, 282, 284, 362/289, 322, 324, 427, 287, 428

[56] References Cited

U.S. PATENT DOCUMENTS 4,271,456 6/1981 Dick ................................ 362/428 X
4,689,725 8/1987 Saijo et al. ............................ 362/66
4,761,717 8/1988 McMahon et al. ................... 362/66
4,849,860 7/1989 Schauwerker .................. 362/289 X
4,884,174 11/1989 Dorleane ........................ 362/287 X

FOREIGN PATENT DOCUMENTS

3509831A1 3/1986 Fed. Rep. of Germany .

*Primary Examiner*—Stephen F. Husar
*Assistant Examiner*—Peggy H. Neils
*Attorney, Agent, or Firm*—Griffin Branigan & Butler

[57] ABSTRACT

A hard plastic reflector (1) is mounted on a receiving member (4) by a joining assembly which comprises a first joining member (5) mounted on the receiving member and a second joining member (6) of plastic which flatly overlaps and lies on a wide side surface of a wall member (2) of the reflector. The overlapping portion of the wall member and the second joining member define overlapping openings (12, 13) or recesses in which a sleeve (16) of elastic material having an elongated fastening device (17) extending therethrough is positioned. The elongated fastening device presses axially, on the sleeve, or extends a bore in the sleeve outwardly, sufficiently so that an outer surface of the sleeve engages surfaces defining the openings and an inner surface of the sleeve engages the elongated fastening device in a compressed manner.

21 Claims, 3 Drawing Sheets

4
5
8
9
3
2
10
18
19
12
13
6
11
14
17
15
16
1

7
4
6'
X
3'
10'
13'
22
21'
12'
2'
1'
5
8
11'
20
17'
16'

9'
3'
16'
21'
2'

16"
17"
y
6"
27
23
24
13"
12"
2"
9"
11"
15"
1"

3"
23
2"
26
25

VEHICLE HEADLIGHT

BACKGROUND OF THE INVENTION

This invention relates to headlights for vehicles having resinous plastic reflectors mounted on receiving members to be rotatable about at least one axis. More particularly, this invention relates to such headlights wherein a joining assembly between such a reflector and a receiving member comprises a first joining member attached to the receiving member and a second joining member of plastic attached to a wall member, with relatively-flat wide side surfaces, formed on a rear side of a reflector bowl.

A related headlight is described in German Offenlegungsschrift 3,509,831 in which a second joining member has a shell shape. This shell is shoved on a wall member until a locking nose on an inner surface of the shell grips a recess in the wall member. Once there, because friction can develope between hard, brittle, and high-temperature plastic of the wall member at a connection between the locking nose and the cavity, a rattle free seating of the shell on the wall member cannot be assured, and it is for this reason that the engaging surface of the wall member which contacts the inner surface of the shell tapers inwardly toward a free end so that the wall member is somewhat cone shaped. Because of a wedge effect of the wall member on the shell, a secure seating of the shell on the wall member is achieved, however, because of the conical shape of the wall member, an end of the wall member attached to the reflector bowl is relatively wide, or thick. Because of this, disturbances, or indentations, can develop on the reflection surface of the reflector which can cause, in turn, disturbing scattered light.

It is an object of this invention to provide an improved headlight of the type described above that has such a thin wall member on a rear side of a reflector that no bothersome disturbances are created on a reflection surface but yet a rattle free connection between the wall member and a reflector's second joining member does not create friction between the wall member and the reflector. Still further, it is an object of this invention to provide such a headlight in which the wall member of the reflector and the second joining member can be fabricated to large tolerances however a joint thereby formed between the two is substantially rattle free.

SUMMARY OF THE INVENTION

According to principles of this invention, a wall member formed on a rear side of a reflection bowl does not have a wall strength and/or thickness which is substantially greater than a wall strength and/or thickness of the reflection bowl itself. The wall member of the reflector and a second joining member lie substantially flush or flat, against overlapped width portions of one another and these overlapping portions have openings therein which overlap as much as possible. An elastic sleeve is positioned in these openings with an elongated fastening member extending therethrough whose length axis is perpendicular to wide side surfaces of the overlapping portions. The elongated fastening member compresses the sleeve and/or expands the bore of the sleeve in which it is located to such an extent that at least a portion of an outer surface of the sleeve is expanded radially outwardly so that a pressed fit is developed between the outer surface of the sleeve and surfaces defining the overlapping openings as well as between the inner surface of the sleeve and the elongated fastening member.

BRIEF DESCRIPTION OF THE DRAWINGS

The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DESCRIPTION OF THE PREFERRED EMBODIMENT

Figure 1:
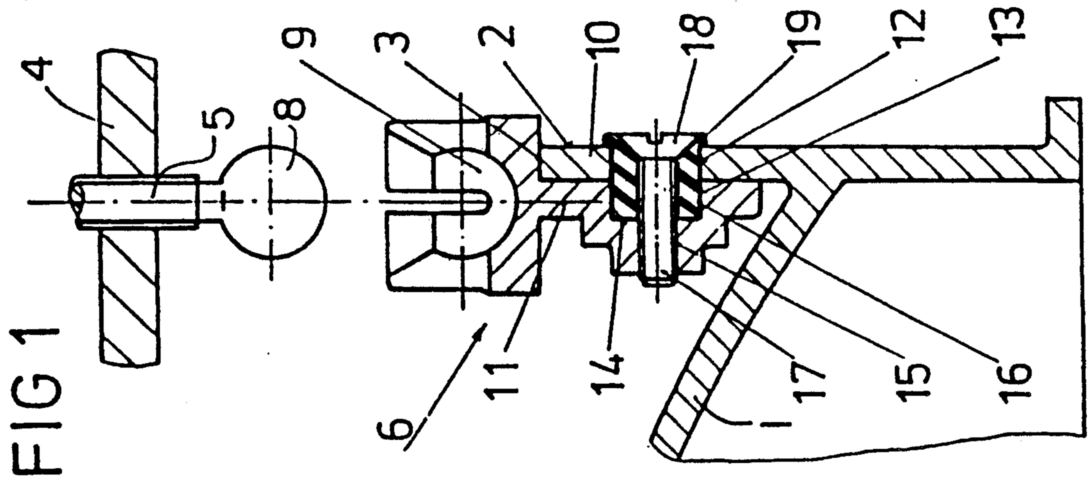
FIG. 1 is an exploded lengthwise cross section through a resinous plastic reflector having a second joining member attached to its rear side for its engagement with a first joining member of a receiving member.

FIG. 1 depicts a resinous plastic reflector having a wall member 2 formed thereon extending away from the reflector 1 in an installation direction of the reflector. The reflector is coupled to a receiving member 4 via a first joining member 5 mounted on the receiving member 4 and a second joining member 6 mounted on the wall member 2. The first joining member 5 is comprised of a threaded bolt having a knob 7 (not shown in FIG. 1, but see FIG. 2) on its outwardly extending end portion and a ball 8 on its end extending into an interior of a headlight cavity defined by the receiving part 4. This ball 8 is self guided into a socket 9 of the second joining member 6 when the reflector 1 is installed on the receiving member 4. The second joining member 6 and the wall member 2 of the reflector overlap one another in a simple, single, overlapping manner. Openings 12 and 13 in the overlapping portions 10 and 11 of the respective wall member 2 and the second joining member 6 overlap to the greatest possible extent. The opening 13 of the second joining member has an end, or floor surface, 14 through which a central threaded bore 15 extends. An elastic cylindrical shell, or grommet, 16 is arranged in the overlapping openings 12 and 13 with an elongated fastening member 17 being shoved into the elastic sleeve 16 prior to its being mounted in the openings. In the embodiment of FIG. 1, a screw or bolt 17 having a threaded shaft which engages threads of the threaded bore 15 serves as the elongated fastening member 17 with its countersink head 18 pressing into the elastic shell 16 at the overlapping openings 12 and 13. Because of this, an outer surface of the elastic cylindrical shell 16 expands outwardly and lies under pressure on edge surfaces defining the openings 12 and 13 and on the floor surface 14. The countersink head, which is smaller in diameter than the openings 12 and 13 presses a portion 19 of the shell between it and an edge forming the opening 12 radially outwardly so that this edge forming the opening and wide side surfaces of the inflexible, hard, wall member 2 of the reflector 1 are encroached upon and held.

It should be understood that the same reference numbers are used to identify similar elements of different embodiments shown in the drawings, but where the elements are not identical additional suffix characters, such as prim symbols, have been added to some of them to differentiate between elements. Similarly, although the singular is often used to describe these elements, it should be understood that there can be a plurality of similar such elements in different embodiments with the same number. Usually, elements of FIGS. 1 and 2 are specifically referred to unless otherwise designated.

Figure 2:
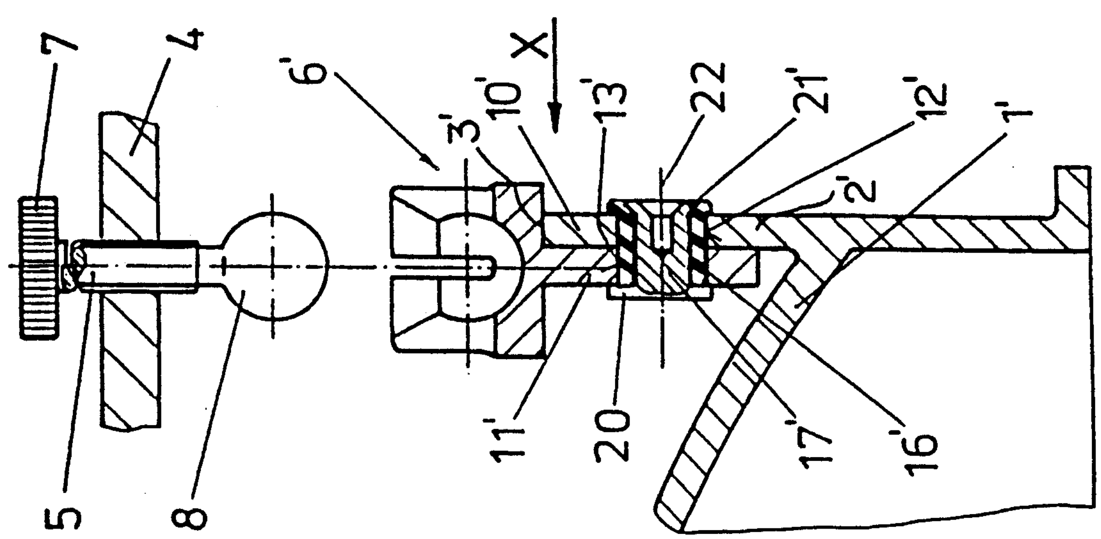
FIG. 2 is a view similar to that of FIG. 1 of a second embodiment in which a modified connection between a second joining member and a wall member of the reflector is shown.
Figure 3:
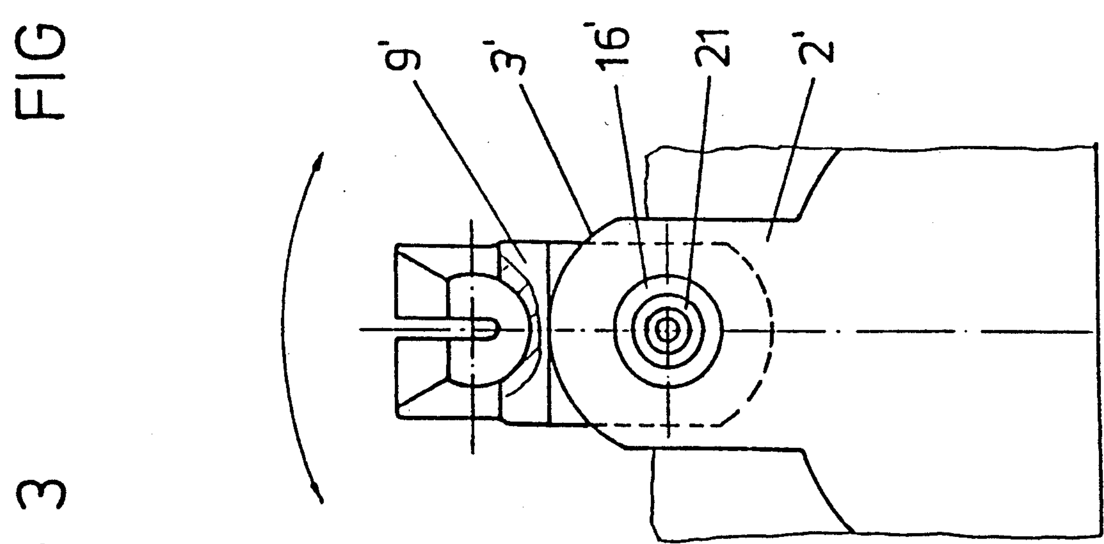
FIG. 3 is a view of the embodiment of FIG. 2 as seen from direction X in FIG. 2 with portions removed.

The embodiment of FIG. 2 differs from the FIG. 1 embodiment in that an opening 13′ extends completely through a second joining member 6′ and a rivet serves as the attaching member 17′. The rivet 17′ has a plate shaped set head 20 for engaging a rim of the second joining member surrounding the opening 13′ and a snap head 21 which is in the shape of a hollow countersink head. The snap head 21 is produced by a punch, or mandrel which is used to expand a bored out shaft of the rivet 17′. A socket portion 19′ of the second joining member 6′ lies on a peripheral outer edge 3′ of the wall member 2′, with the outer edge 3′ of the wall member 2′ describing a circular arc whose center is at a rotation axis 22 for the second joining member 6′ formed by the sleeve 16′ and the openings 12′ and 13′. If the second joining member 6′ sits on the wall member 3′ so as to be rigid in all directions it is beneficial if the peripheral outer edge 3 of the wall member 2 runs along a straight line.

Figure 4:
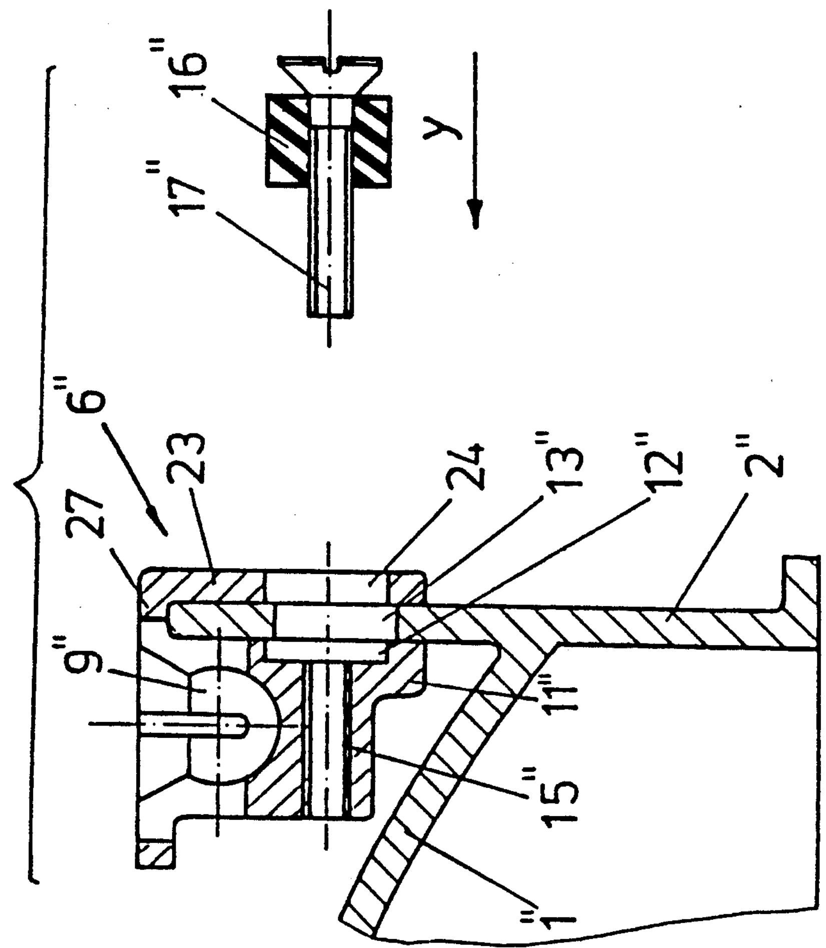
FIG. 4 is an exploded cross sectional view of a further embodiment of the second joining member and its attachment to a wall member of the reflector.
Figure 5:
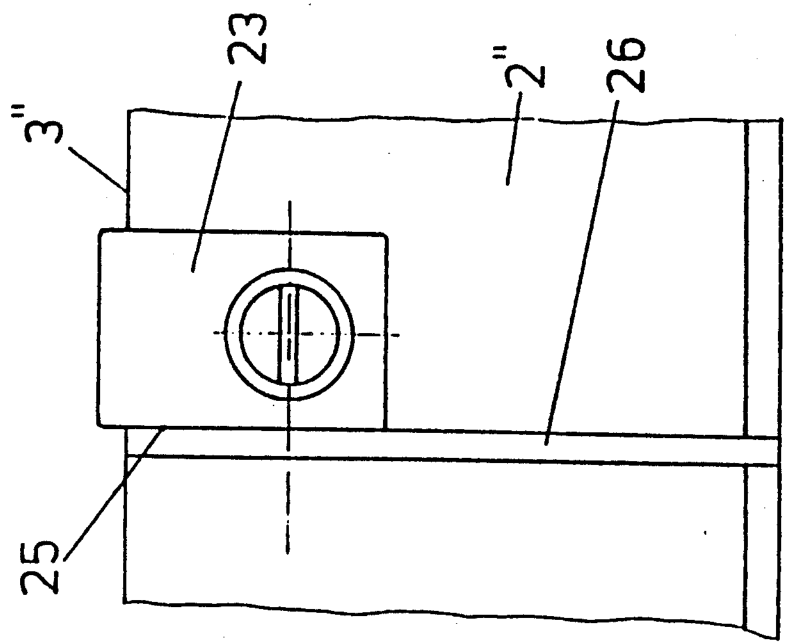
FIG. 5 is a view taken from direction Y in FIG. 4.

According to the FIGS. 4 and 5 embodiment, a second joining member 6″ is made to be clamp-like. The clamp-like second joining member 6″ is placed on a wall member 2″. In this manner, a double overlapping attachment is produced. As opposed to the second joining member 6 of FIG. 1, the second joining member 6″ of FIGS. 4 and 5 distinguishes itself in that the second joining member 6″ not only lies against a first wide surface of the wall member 2″, but also lies against a second wide side surface thereof with a portion 23. To ensure that the second joining member 6″ is mounted on the wall member 2″ so that openings 12″, 13″ and 24 are aligned with one another, a narrow, long-side, surface 25 of the second joining member 6″ glides along a rib 26 on the wall member 2″ until a cross member 27 which binds portions 11″ and 23 of the second joining member 6″ together, lies on an outer peripheral edge 3″ of the wall member 2″. The opening 13″ in the wall member 2″ is positioned from the outer peripheral edge 3″ a greater distance than openings 12″ and 24 of the second joining member 6″. With this arrangement it is guaranteed that the cross member 27 is biased tightly against the outer peripheral edge of the wall member 2″ after screw 17″ with an elastic shell 16″ are placed in the openings. With this second joining member 6″ a socket 9″ is aligned behind a threaded bore 15″ on the portion 11″ in the installation direction of the reflector.

Figure 6:
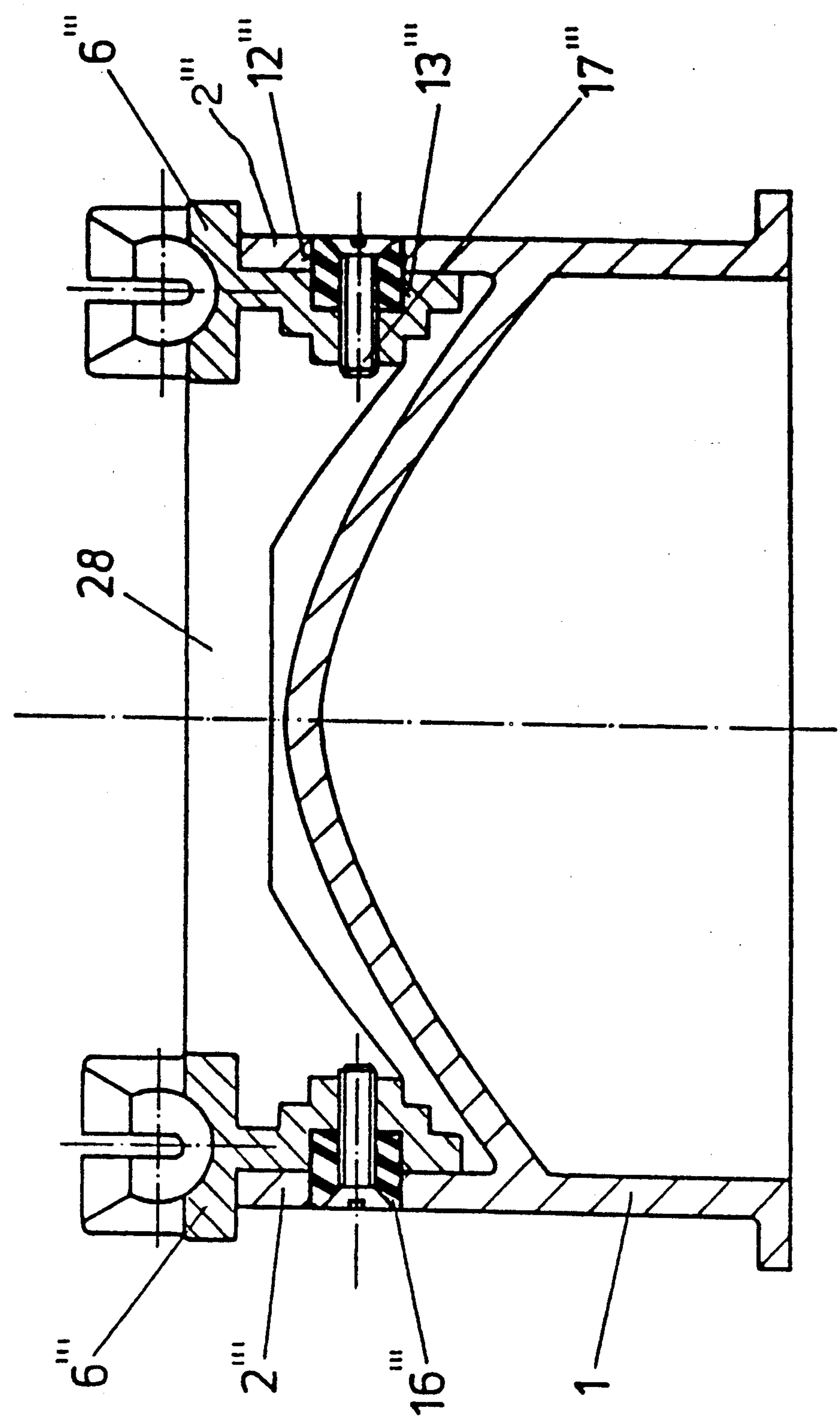
FIG. 6 is a cross section through a reflector having a bridge held to a rear surface thereof by two second joining members of this invention.

In FIG. 6 a bridge 28 has second joining members 6‴ formed on ends thereof. The bridge, together with the second joining members 6‴, is shoved between two wall members 2‴. There can be play between the bridge and the wall members since the sleeve is not so long that a wide surface of an outer rim forming the opening 12‴ in each of the wall members 2‴ of the reflector is thereby gripped, thereby pressuring the wall member in the direction of the reflector.

A reflector of a beneficial headlight of the type described for this invention is not significantly larger than a light exit area of the reflector as seen from the front. Further, with this arrangement, as seen from in front of the reflector, the first and second joining parts do not extend outwardly beyond surrounding forward rims of the reflector. In this manner, a cavity in a receiving member for receiving the reflector does not have to be larger than is necessary to accommodate the joining members.

It is further beneficial that a single or double overlapping is created between the wall member of the reflector and the second joining member. A simple (single) or double overlapping is sufficient for creating a secure seating of the second joining member on the wall member of the reflector. It is further beneficial when openings in the overlapping portions form a bore which passes completely therethrough and when an elongated fastening member is a rivet whose set head engages an outer rim defining the bore and a snap head only contacts the sleeve. Such a fastening can be manufactured quite cost effectively because the sleeve and the rivet are off-the-shelf items. In this regard, it is further beneficial for the snap head to comprise a hollow countersink head with the set head lying on a portion of the second joining member which overlaps the wall member. Such a snap head is expanded at a hollow shaft end of the rivet by means of a mandrel and, because the set head lies on the second joining member, no friction can arise between the rivet and the hard brittle wall member of the reflector.

In a further preferred embodiment of the invention, a screw or bolt serves as the elongated fastening member on whose threaded shaft the sleeve is shoved so that an end surface of the sleeve lies at a head of the screw and the other end surface of the sleeve is at a floor surface of the overlapping opening. In this regard, it is helpful if, before mounting the second joining member, the sleeve is shoved on a threaded shaft of the screw or bolt and thereafter the screw or bolt is inserted in the overlapping openings. In addition, this solution is quite cost effective because the second joining member is the nut of the screw or bolt.

In this connection, it is beneficial for the head of the bolt to form a countersink head which is arranged to countersink into the sleeve. By using a countersink head, as the sleeve is urged in the axial direction, it will also be pressed outwardly. In this manner, seating of the sleeve in the overlapping openings is secure.

It is equally beneficial when that portion of the sleeve between the snap head or screw head and an adjacent rim forming an opening is pressed outwardly to such an extent that the rim is encroached on or overlapped. This is particularly helpful when there is a single, or simple overlapping because the seating of the overlapping portions are thereby held secure, also square to their wide side surfaces. It is also beneficial when the snap head of a rivet, or the head of a screw is smaller in diameter than the diameter of overlapping openings. In this manner, it is not possible that the head of the screw will come directly in contact with a rim forming the opening of the hard wall member of the reflector.

Further, it is beneficial for the sleeve and the overlapping openings to form an axis about which the second joining member is rotatable. In this manner it is possible to adjust the position of the reflector without transferring stresses to the reflector. Further, it is helpful for a distance of the opening of the wall members from its outer peripheral edge to be somewhat greater than a distance of the opening of the second joining member from its surface which lies on the wall member outer peripheral edge. With such a solution, it is assured that the second joining member is always urged against the outer peripheral edge of the wall member of the reflector.

Still further, it is beneficial to have double overlapping of a clamp-like second joining member which is mounted on the wall member. Such a solution is not only quite cost effective to produce, but also creates a very secure seating of the second joining member on the wall member.

It is a further benefit to have a resinous plastic bridge with second joining members formed at opposite ends thereof mounted between two somewhat parallel wall members of the reflector. In this arrangement it is helpful to have only a single overlapping between the second joining members and their respective wall members. Such a bridge can serve to stiffen a very thin wall reflector and in addition is quicker to install than two separate second joining members.

It is still further useful if there is play room between such a bridge and both wall members of the reflector and if outer surfaces of an elastic sleeve only contact rim surfaces defining the overlapping openings. In this arrangement, close tolerances are not necessary during manufacture of the bridge and when the wall members and the bridge are combined the wall members will not be urged with an unduly large force toward the bridge so that the reflector is disformed to have a changed reflection surface producing bothersome scattered light.

It is a further benefit for a narrow length side of an overlapping portion of the second joining member to lie on a rib of the wall member and for the second joining member to contact a surface of the outer peripheral edge of the wall member. In this manner, after the second joining member is set on the wall member, the opening of the second joining member is positioned exactly over the opening of the wall member.

While the invention has been particularly shown and described with reference to a preferred embodiment, it will be understood by those skilled in the art that various changes in form and detail may be made therein without departing from the spirit and scope of the invention.

The embodiments of the invention in which an exclusive property or privilege are claimed are defined as follows:

We claim:

1. In a headlight of a type comprising a joining means for mounting a hard resinous plastic reflector bowl on a receiving member to be adjustable about at least one axis with the joining means comprising a first joining member attached to the receiving member and a second joining member of resinous plastic attached to wall a member, having relatively flat wide side surfaces, formed on a rear surface of the reflector bowl, the improvement wherein:

the wall strength of the wall member of the reflector formed on the rear surface of the reflector bowl is not substantially greater than the wall strength of the thin wall reflector bowl, the wall member of the reflector and the second joining member lie substantially flush against one another with overlapping portions having openings which overlap, and there is an elastic sleeve positioned in the openings with an elongated fastening means extending therethrough whose length axis runs perpendicular to wide side surfaces of the overlapping portions for expanding an outer surface of the sleeve outwardly, or radially, to form a press fit between the outer surface of the sleeve and surfaces of the overlapping portions as well as between an inner surface of the sleeve and the elongated fastening means.

2. In a headlight as in claim 1 wherein there is a single overlapping between the wall member of the reflector and the second joining member.

3. In a headlight as in claim 1 wherein there is a double overlapping between the wall member of the reflector and the second joining member.

4. In a headlight as in claim 1 wherein the openings form a bore, extending completely through the overlapping portions.

5. In a headlight as in claim 4 wherein the elongated fastening means is a rivet.

6. In a headlight as in claim 5 wherein a set head of the rivet engages one of the overlapping portions defining the bore and a snap head of the rivet engages only the sleeve.

7. In a headlight as in claim 6 wherein the set head engages the second-joining member of the overlapping portions.

8. In a headlight as in claim 6 wherein the snap head of the rivet is in the form of a hollow countersink head.

9. In a headlight as in claim 1 wherein the fastening means comprises a headed threaded shaft.

10. In a headlight as in claim 9 wherein a first end surface of the sleeve engages a head of the threaded shaft and a second end surface of the sleeve engages a floor surface of the overlapping portions defining the openings while a threaded end portion of the threaded shaft engages threads in a female threaded bore of the second joining member passing through the floor surface.

11. In a headlight as in claim 9 wherein the head of the threaded shaft has a countersink shape which is counter sunk into the sleeve.

12. In a headlight as in claim 1 wherein the fastening means includes a head and wherein the sleeve is compressed so tightly between the head and a portion of the first and second overlapping portions defining the openings so as to be expanded radially outwardly to encroach on rims of the overlapping portions radially defining the openings.

13. In a headlight as in claim 1 wherein a head of the fastening means has a cross section which is smaller than the radial size of the overlapping openings.

14. In a headlight as in claim 1 wherein the sleeve and the overlapping openings define an axis about which the second joining member is pivotable.

15. In a headlight as in claim 1 wherein the distance of the opening in the wall member from a peripheral outer edge of the wall member is greater than the distance of the opening of the second joining member from this peripheral outer edge.

16. In a headlight as in claim 3 wherein double overlapping is accomplished by means of a clamp-like second joining member which is mounted on the wall member of the reflector.

17. In a headlight as in claim 1 wherein there are two approximately parallel wall members formed on the rear surface of said reflector bowl and wherein is further included a resinous plastic bridge installed between said wall members by second joining member at ends thereof.

18. In a headlight as in claim 17 wherein a single overlapping exists between the second joining members and their respective wall members.

19. In a headlight as in claim 17 wherein there is play space between each wall member of the reflector and the bridge with its attached second joining members.

20. In a headlight as in claim 1 wherein a radially-directed outer surface of the sleeve contacts only surfaces of the overlapping portions.

21. In a headlight as in claim 1 wherein a narrow length side of an overlapping portion of the second joining member engages a rib on the wall member and a further surface of the second joining member engages an outer peripheral edge of the wall member.

* * * * *